United States Patent
Abrahamsson et al.

(10) Patent No.: US 12,443,174 B2
(45) Date of Patent: Oct. 14, 2025

(54) METHOD AND AN APPARATUS FOR INCREASING EFFICIENCY OF A FOOD PRODUCTION PLANT

(71) Applicant: Tetra Laval Holdings & Finance S.A., Pully (CH)

(72) Inventors: Mattias Abrahamsson, Annelöv (SE); Sebastian Nygren, Arlöv (SE); Rickard Moberg, Teckomatorp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 414 days.

(21) Appl. No.: 18/000,921

(22) PCT Filed: May 28, 2021

(86) PCT No.: PCT/EP2021/064407
§ 371 (c)(1),
(2) Date: Dec. 6, 2022

(87) PCT Pub. No.: WO2021/249794
PCT Pub. Date: Dec. 16, 2021

(65) Prior Publication Data
US 2023/0221711 A1  Jul. 13, 2023

(30) Foreign Application Priority Data
Jun. 12, 2020 (EP) .................... 20179798

(51) Int. Cl.
*G05B 19/418* (2006.01)
(52) U.S. Cl.
CPC ............... *G05B 19/41885* (2013.01)
(58) Field of Classification Search
None
See application file for complete search history.

(56) References Cited

U.S. PATENT DOCUMENTS

| | | | |
|---|---|---|---|
| 5,768,119 A * | 6/1998 | Havekost | G05B 23/0208 709/224 |
| 6,576,280 B2 * | 6/2003 | Bebiak | A01K 5/02 705/16 |

(Continued)

FOREIGN PATENT DOCUMENTS

| | | |
|---|---|---|
| CN | 107976969 A | 5/2018 |
| CN | 109947242 A | 6/2019 |

(Continued)

OTHER PUBLICATIONS

Nicholls, Howard R., Jem J. Rowland, and M. G. Taylor. "Using simulation for plant monitoring in real time." Proceedings of International Conference on Robotics and Automation. vol. 4. IEEE, 1997. (Year: 1997).*

(Continued)

*Primary Examiner* — Carlos R Ortiz Rodriguez
(74) *Attorney, Agent, or Firm* — Knobbe Martens Olson & Bear LLP

(57) ABSTRACT

A method for increasing efficiency of a food production plant is provided. A method for increasing efficiency of a food production plant can include extracting plant data, generating a digital model of the food production plant based on the plant data, wherein the digital model comprises equipment objects (A-E) having actions (i-xii) linked thereto, connections (I-V) between the equipment objects (A-E), and series of actions linked to equipment object arrangements, identifying a current equipment object arrangement in the digital model that corresponds to an initial equipment object arrangement of the initial production scenario of a matching assistant object, replacing the current equipment object arrangement and a current series of activities linked to the current equipment object arrangement with the recommended equipment object arrangement and (Continued)

the recommended series of the matching assistant object in the digital model updating the food production plant based on the update data.

18 Claims, 3 Drawing Sheets

(56) References Cited

U.S. PATENT DOCUMENTS

| | | | | |
|---|---|---|---|---|
| 7,012,154 | B2* | 3/2006 | Vineyard | C07C 407/003 |
| | | | | 252/186.26 |
| 7,031,782 | B2* | 4/2006 | Kappelhoff | G06Q 20/203 |
| | | | | 700/95 |
| 8,046,086 | B2* | 10/2011 | Pettus | G05B 19/4184 |
| | | | | 710/242 |
| 8,606,379 | B2* | 12/2013 | Marruchella | G06Q 10/06 |
| | | | | 700/86 |
| 8,635,179 | B2* | 1/2014 | Cao | G06Q 10/087 |
| | | | | 700/95 |
| 10,070,657 | B1* | 9/2018 | Chappell | A22B 5/0035 |
| 2003/0150909 | A1* | 8/2003 | Markham | G06Q 10/06 |
| | | | | 235/376 |
| 2009/0307670 | A1 | 12/2009 | Kashyap et al. | |
| 2012/0109789 | A1* | 5/2012 | Bhatt | G06Q 10/0875 |
| | | | | 705/29 |
| 2017/0192407 | A1 | 7/2017 | Kurella et al. | |
| 2017/0351226 | A1 | 12/2017 | Bliss et al. | |
| 2020/0023293 | A1* | 1/2020 | Knoop | B01D 29/661 |

FOREIGN PATENT DOCUMENTS

| | | |
|---|---|---|
| EP | 3514741 A1 | 7/2019 |
| JP | 2008-252841 A | 10/2008 |
| JP | 2010-128607 A | 6/2010 |
| KR | 101846793 | 4/2018 |
| WO | WO 2020/040763 A1 | 2/2020 |

OTHER PUBLICATIONS

Banga, Julio R., et al. "Improving food processing using modern optimization methods." Trends in food science & Technology 14.4 (2003): 131-144. (Year: 2003).*
Hernández, J. A. "Use of neural networks and neural network inverse in optimizing food processes." CABI Reviews 2009 (2009): 1-11. (Year: 2009).*
Mahalik, Nitaigour-Premchand, and Matthew Yen. "Extending fieldbus standards to food processing and packaging industry: A review." Computer Standards & Interfaces 31.3 (2009): 586-598. (Year: 2009).*
Zhang, Demin, and Shibo Li. "Design and realization of liquid filling machine intelligent control system." 2015 IEEE International Conference on Mechatronics and Automation (ICMA). IEEE, 2015. (Year: 2015).*
Erdogdu, Ferruh, Fabrizio Sarghini, and Francesco Marra. "Mathematical modeling for virtualization in food processing." Food engineering reviews 9 (2017): 295-313. (Year: 2017).*
Guiné, Raquel. "The use of artificial neural networks (ANN) in food process engineering." International Journal of Food Engineering 5.1 (2019): 15-21. (Year: 2019).*
Accorsi, R., et al. "An application of collaborative robots in a food production facility." Procedia Manufacturing 38 (2019): 341-348. (Year: 2019).*
International Search Report in International Application No. PCT/EP2021/064407 dated Jul. 27, 2021 in 2 pages.
Extended European Search Report in European Application No. 20179798.2 dated Nov. 24, 2020 in 9 pages.
Communication pursuant to Article 94(3) received in EP 3923100 dated Apr. 26, 2023.
Office Action with Search Report received in corresponding Chinese patent application No. 202180041639.2 dated May 13, 2025.

* cited by examiner

METHOD AND AN APPARATUS FOR INCREASING EFFICIENCY OF A FOOD PRODUCTION PLANT

TECHNICAL FIELD

The invention relates to software technology within food production. More particularly, it is related to methods and apparatuses for increasing efficiency of a food production plant, servers configured to increase efficiency of the food production plant, and methods for creating a plant assistant library to be used for increasing the efficiency of the food production plant.

BACKGROUND ART

Food production plants of today are complex. One reason is that food production units, such as heat exchangers, separators, homogenizers and filling machines, that form part of the food production plant may be arranged differently, and settings of one food production unit may not only affect the food production unit itself, but also other food production units placed downstream. In addition, the food production units can be placed in different order. Further, the food production plant can also be arranged with parallel production units, such as tanks, such that one tank may be used for production while another tank is cleaned. Designing the food production plant thus require both understanding of individual food production units, how these may affect one another as well as how the food production plant on an overall level can operate.

In addition to providing for that the food production plant is arranged such that food products can be produced, it is most often required that the plant is arranged such that the production is efficient in terms of product waste, energy as well as time. Therefore, today within food production industry new ways of improving efficiency of plants are constantly sought after. Savings achieved in this way, on product, processing media or energy, can give both cost-savings and environmental savings.

One way of improving the efficiency is to optimize the food production units. To improve on line level or on plant level, changes in a control system may be made. It is however not an easy task to identify possible improvements and there is a risk that the changes lead to unwanted side effects. Thus, it can be both a hard and time-consuming process to test the possible improvements in the production plant and there is a risk that ongoing production is affected.

Based on the above, there is a need for a process or tool for optimizing the production plant such that more efficient production can be achieved.

SUMMARY

It is an object of the invention to at least partly overcome one or more of the above-identified limitations of the prior art. In particular, it is an object to provide a method for increasing efficiency of a food production plant by providing a plant assistant library comprising production scenarios.

It has been realized that learnings made when setting up or operating one production plant can be shared efficiently by creating a digital model, sometimes referred to as data model, for the production plants and thereafter with the help of a so-called plant assistant library identify possible improvements in the form of production scenarios, referred to as initial production scenarios, and how these can be changed, referred to as recommended production scenarios, to improve the efficiency. The plant assistant library can comprise the initial production scenarios as well as the recommended production scenarios. Both of these can comprise information on how equipment, that is the food production units, are arranged, referred to as initial equipment object arrangement and recommended equipment object arrangement, respectively, as well as how these should be used, referred to as initial series of actions and recommended series of action, respectively. By having these plant assistant objects and having digital models for the production plants, it is hence possible to identify possible improvements and to suggest how the food production units should be re-arranged, which may be used by redirecting product flow by using valves, and how the food production units should be set.

According to a first aspect it is provided a method for increasing efficiency of a food production plant, said method may comprise extracting plant data from a control system of the food production plant, wherein the control system may be communicatively connected to control units placed in food production units in the food production plant, generating a digital model of the food production plant based on the plant data extracted from the control system, wherein the digital model may comprise equipment objects having actions linked thereto, connections between the equipment objects, and series of actions linked to equipment object arrangements, downloading a plant assistant library which may comprise a number of assistant objects, each assistant object may comprise an initial production scenario comprising an initial series of actions linked to an initial equipment object arrangement, and a recommended production scenario comprising a recommended series of actions linked to a recommended equipment object arrangement, wherein the recommended production scenario may provide for an increased efficiency of the food production plant compared to the initial production scenario, identifying a current equipment object arrangement in the digital model that may correspond to the initial equipment object arrangement of the initial production scenario of a matching assistant object, replacing the current equipment object arrangement and a current series of activities linked to the current equipment object arrangement with the recommended equipment object arrangement and the recommended series of the matching assistant object in the digital model, transmitting update data which may correspond to the recommended equipment object arrangement and the recommended series in the digital model to the control system, updating the food production plant based on the update data.

An advantage with having the digital model for increasing efficiency as described above is that the method may be control system independent. In other words, possible shortcomings in the control system will not hinder the digital model since the digital model may retrieve the plant data directly from sensor or control units in the food production units, if not possible or inconvenient to retrieve this data via the control system. Still an advantage related this control system independency is that learnings may be shared between food production plants using different types of control systems. Having a large base of food production plants provide for that a more comprehensive plant assistant library can be achieved.

A further advantage is that this may be added to an existing food production plant. This is advantageous in that this can be added to an installed and operating food production plant at a low cost since the plant may continue to run, at least to a very large extent, when this extra functionality is added.

The plant assistant library may be retrieved from a central server connected to a plurality of food production plants having digital models, said central server may be configured to continuously log data from the digital models and create assistant objects based on the data.

The digital model may be control system type independent.

To provide for that different types of control systems can be managed efficiently, it has been realized that the digital model may be formed based on properties of the food production plant retrieved via the control system. To avoid a control system type dependency, the properties may be transformed into data model properties based upon which the data model is built. Thus, if using a central server for hosting the data model, it is enough that a software used in the central server for transforming the properties to the data model properties are made to support the different types of control systems.

The initial production scenario and the recommended production scenario may comprise a food product being produced, and food properties associated with the food product being produced.

An advantage of having the food product forming part of the initial production scenario and the recommended production scenario is that different food product may need different treatment. For instance, an orange juice product comprising pulp may result in that a tubular heat exchanger without baffles should be used to avoid that fibers are stuck in the baffles, while a nectar product, which is not containing pulp, may be used in a tubular heat exchanger with baffles.

The method may further comprise determining a current food product transformation for the current equipment object arrangement and a current series of activities, and a recommended food product transformation for the recommended series of actions linked to a recommended equipment object arrangement.

Since different treatment, also referred to as processing, may result in that the food product properties are affected differently it is possible to add information about this in the plant assistant objects. An advantage with this is that an increased control of the food production plant may be offered.

The method may further comprise determining a current energy usage for the current equipment object arrangement and a current series of activities, and a recommended energy usage for the recommended series of actions linked to the recommended equipment object arrangement.

An advantage with this is that energy savings can easily be taken into account for, which is advantageous in that for instance a minor difference in texture of the food product may be weighed against an energy saving. Put differently, this provides for that the food production plant may be optimized with a wide range of aspects taken into account.

The method may further comprise determining a current production time for the current equipment object arrangement and the current series of activities, and a recommended production time for the recommended series of actions linked to the recommended equipment object arrangement.

As above, this provides for that a wide range of aspects may be taken into account for when optimizing the food production plant.

An initial order in which the food production units is used in the initial production scenario may be different from a recommended order in which the food production units is used in the recommended production scenario.

The step of identifying the current equipment object arrangement in the digital model that corresponds to the initial equipment object arrangement of the initial production scenario of the matching assistant object may be made by an artificial intelligence (AI) based software, wherein the AI based software is trained on approved digital models of food production plants.

Identifying corresponding equipment object arrangements may be a so-called one-to-one matching, that is, identical equipment arrangements are required for being considered to match, but it may also be that they are not required to be exact identical, but in essence identical. To be able to handle such a situation the AI based software may come in handy. The software may be trained based on digital models before and after the step of updating for cases where the recommended production scenario is considered successful, or, put differently, is approved and introduced into that food production plant.

According to a second aspect it is provided a server configured to increase the efficiency of a food production plant, the server comprising:
a transceiver configured to:
transmit update data corresponding to recommended equipment object arrangement and recommended series in a digital model to a control system,
a control circuit configured to execute:
an extraction function configured to extract plant data from a control system of the food production plant, wherein the control system is communicatively connected to control units placed in food production units in the food production plant,
a generating function configured to generate a digital model of the food production plant based on the plant data extracted from the control system, wherein the digital model comprises equipment objects having actions linked thereto, connections between the equipment objects, and series of actions linked to equipment object arrangements,
a downloading function configured to download a plant assistant library comprising a number of assistant objects, each assistant object comprising
an initial production scenario comprising an initial series of actions linked to an initial equipment object arrangement, and
a recommended production scenario comprising a recommended series of actions linked to a recommended equipment object arrangement, wherein the recommended production scenario provides for an increased efficiency of the food production plant compared to the initial production scenario,
an identification function configured to identify a current equipment object arrangement in the digital model that corresponds to the initial equipment object arrangement of the initial production scenario of a matching assistant object,
a replacing function configured to replace the current equipment object arrangement and a current series of activities linked to the current equipment object arrangement with the recommended equipment object arrangement and the recommended series of the matching assistant object in the digital model,
an updating function configured to update the food production plant based on the update data.

The control circuit may further be configured to execute:

a first determining function configured to determine a current food product transformation for the current equipment object arrangement and a current series of activities, and a recommended food product transformation for the recommended series of actions linked to a recommended equipment object arrangement.

The control circuit may further be configured to execute:
a second determining function configured to determine a current energy
usage for the current equipment object arrangement and a current series of activities, and a recommended energy usage for the recommended series of actions linked to the recommended equipment object arrangement.

The control circuit may further be configured to execute:
a third determining function configured to determine a current production time for the current equipment object arrangement and the current series of activities, and a recommended production time for the recommended series of actions linked to the recommended equipment object arrangement.

According to a third aspect it is provided a method for creating a plant assistant library to be used for increasing efficiency of a food production plant (100) according to the first aspect, wherein the method comprises,
receiving digital models on food production plants,
identifying corresponding production scenarios in the digital models,
selecting the initial production scenario among the corresponding production scenarios based on a first requirements set, and
selecting the recommended production scenario among the corresponding scenarios based on a second requirements set.

An advantage with having the first set of requirements for the initial production scenario and the second set of requirements for the recommended production scenario is that these may be set such that only changes are suggested that will provide improvements in terms of efficiency above a certain threshold. The first and second requirements sets may correspond to each other in part.

According to a fourth aspect it is provided a computer program comprising instructions for implementing a method to the first aspect.

Still other objectives, features, aspects and advantages of the invention will appear from the following detailed description as well as from the drawings. The same features and advantages described with respect to one aspect are applicable to the other aspects unless explicitly stated otherwise.

BRIEF DESCRIPTION OF THE DRAWINGS

Embodiments of the invention will now be described, by way of example, with reference to the accompanying schematic drawings, in which.

DETAILED DESCRIPTION

Figure 1:
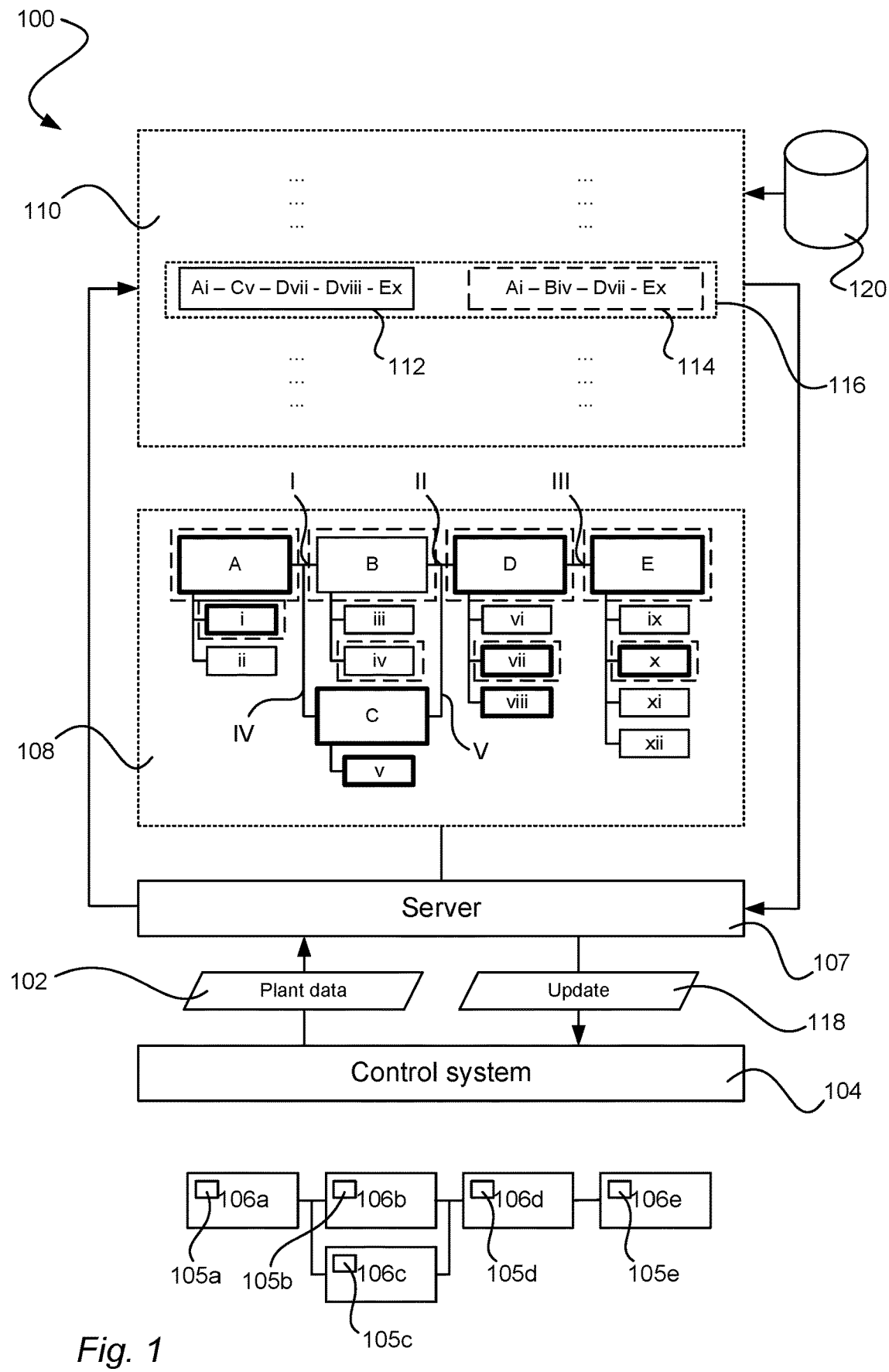
FIG. 1 is a schematic view of a food production plant.

FIG. 1 illustrates an overview of a food production plant 100 by way of example. The food production plant 100 may be described by plant data 102 that may be provided via a control system 104. The control system 104 can be connected to control units 105a-e placed in food production units 106a-e. The control units 105a-e may be Programmable Logic Controllers (PLCs) or other similar type of equipment that can be used for controlling in food production plants. The food production units 106a-e may be food processing equipment, such as heat exchangers, separators, homogenizers, but also pipes, valves and pumps that are not directly involved in processing a food product. Further, the food production units 106a-e can be packaging equipment, such as filling machines, but also so-called downstream equipment, such as film wrappers, straw applicators and palletizers.

As illustrated, the food production units 106a-e may be arranged such that different food production lines may be achieved. Put differently, the food production units 106a-e may be arranged such that the food product can be fed through different sub-sets of the food production units 106a-e and also in different orders. To provide for that the food product can be fed through the food production units 106a-e in different ways, valve arrangements may be utilized.

The plant data 102 that can be extracted from the control system 104 may be fed to a server 107. In the server 107, a digital model 108 of the food production plant 100 may be generated. The digital model 108 may comprise equipment objects A-E that corresponds to the food production units 106a-e. The equipment objects A-E can have linked actions i-xii. In case the equipment object is tank, the actions i-xii may for instance be filling tank, stirring the food product in the tank with an agitator at a first speed, stirring the food product in the tank with the agitator at a second speed, emptying the tank etc. Connections I-V between the different equipment objects A-E may be provided to reflect how the food product can be fed through the food production plant 100.

To improve efficiency of the food production plant 100, a plant assistant library 110 may be downloaded. If only a part of the plant assistant library 110 is deemed relevant, only this part of the plant assistant library 110 may be downloaded.

The plant assistant library 110 may comprise a number of different plant assistant objects comprising initial production scenarios connected to recommended production scenarios. Each of the initial production scenarios may comprise an initial series of actions linked to an initial equipment object arrangement, and each of the recommended production scenarios may comprise a recommended series of actions linked to a recommended equipment object arrangement.

A current object arrangement, that is, which food production units 106a-e that are currently used and in which order these are used, can be compared to different initial equipment object arrangements such that an initial production scenario 112, in which an initial equipment object arrangement corresponding to the current object arrangement is present, can be identified. Linked to the initial production scenario 112 it is provided a recommended production scenario 114, and the two can be said to form a matching assistant object 116, that is, a plant assistant object that is matching the current usage of the food production units 106a-e.

After having identified the matching assistant object 116, the recommended production scenario 114 can be provided to the server 107 which in turn may provide information related to the recommended production scenario 114 of the matching assistant object 116 to the control system 104 in the form of update data 118. The update data 118 can be information that can provide for that the food production is changed to be performed in accordance with the recommended production scenario 114.

As provided by way of example in FIG. 1, the initial production scenario 112, as well as the current production scenario, may involve the equipment objects A-C-D-D-E and the actions i-v-vii-viii-x, and the recommended production scenario may involve the equipment objects A-B-D-E and the actions i-iv-vii-x. Thus, when changing the production according to the update data 118 the food product will be transferred via different set of food production units 106*a*-106*b*-106*d*-106*e* instead of the previously used food production units 106*a*-106*c*-106*d*-106*e*.

The plant assistant library 110 may be held in a central server 120. An advantage with holding the plant assistant library 120 in this way is that this may be shared by different food production plants, which provides for that successful optimization made in one food production plant may easily be shared with others.

Figure 2:
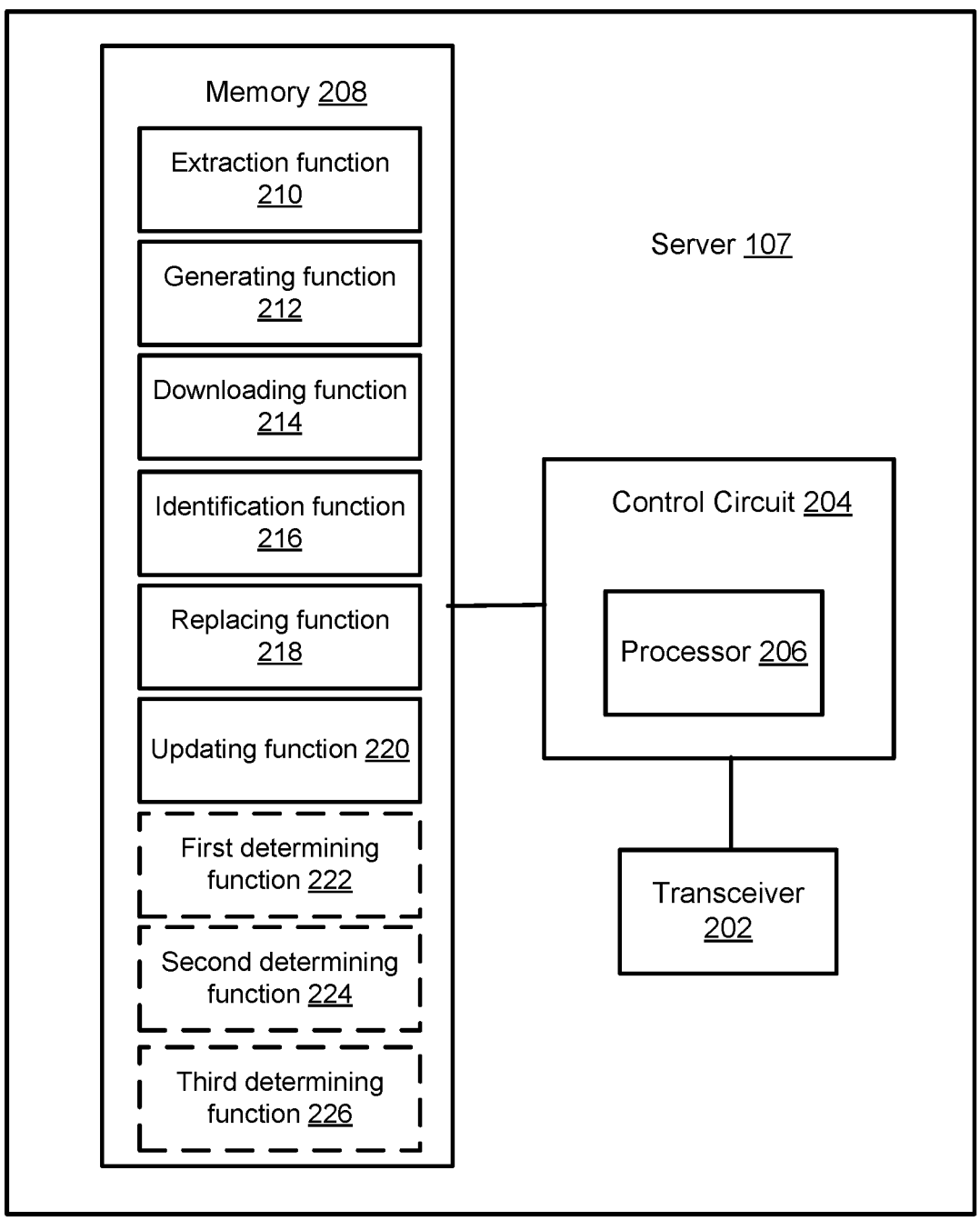
FIG. 2 illustrates a server configured to increase the efficiency of a food production plant.

FIG. 2 illustrates a schematic view of a server 107. The server 107 may be configured to increase efficiency of a food production plant 100. The server 107 can comprise a transceiver 202, a control circuit 204 and a memory 208.

The transceiver 202 can be configured to enable the server 107 to communicate with other devices, such as the control system of the food production plant 100. The transceiver 202 may be configured to transmit the update data 118 corresponding to the recommended equipment object arrangement and recommended series in the digital model 108 to the control system 104.

The control circuit 204 may be configured to perform the control of functions and operations of the server 107. The control circuit 204 may include a processor 206, such as a central processing unit (CPU). The processor 206 can be configured to execute program code stored in the memory 208, in order to perform functions and operations of the server 107.

The control circuit 204 may execute an extraction function 210. The extraction function 210 can be configured to extract the plant data 102 from the control system 104 of the food production plant 100 wherein the control system 104 can be communicatively connected to the control units 105*a*-*e* placed in the food production units 106*a*-*e* in the food production plant 100.

The control circuit 204 may execute a generating function 212. The generating function 212 can be configured to generate the digital model 108 of the food production plant 100 based on the plant data 102 extracted from the control system 104, wherein the digital model 108 can comprise equipment objects A-E having actions i-xii linked thereto, connections I-V between the equipment objects A-E, and series of actions linked to equipment object arrangements.

The control circuit 204 may execute a downloading function 214. The downloading function 214 can be configured to download a plant assistant library 110 comprising a number of assistant objects, each assistant object comprising the initial production scenario 112 comprising the initial series of actions linked to the initial equipment object arrangement, and the recommended production scenario 114 comprising a recommended series of actions linked to a recommended equipment object arrangement, wherein the recommended production scenario 114 provides for an increased efficiency of the food production plant 100 compared to the initial production scenario 112.

The control circuit 204 may execute an identification function 216. The identification function 216 can be configured to identify the current equipment object arrangement in the digital model 108 that corresponds to the initial equipment object arrangement of the initial production scenario 112 of a matching assistant object 116.

The control circuit 204 may execute an replacing function 218. The replacing function 218 can be configured to replace the current equipment object arrangement and a current series of activities linked to the current equipment object arrangement with the recommended equipment object arrangement and the recommended series of the matching assistant object in the digital model 108.

The control circuit 204 may execute an updating function 220. The updating function 220 may be configured to update the food production plant 100 based on the update data 118.

Optionally, the control circuit 204 may execute a first determining function 222. The first determining function 222 can be configured to determine a current food product transformation for the current equipment object arrangement and the current series of activities, and a recommended food product transformation for the recommended series of actions linked to the recommended equipment object arrangement.

Optionally, the control circuit 204 may execute a second determining function 224. The second determining function 224 can be configured to determine a current energy usage for the current equipment object arrangement and the current series of activities, and a recommended energy usage for the recommended series of actions linked to the recommended equipment object arrangement.

Optionally, the control circuit 204 may execute a third determining function 226. The third determining function 226 can be configured to determine a current production time for the current equipment object arrangement and the current series of activities, and a recommended production time for the recommended series of actions linked to the recommended equipment object arrangement.

Figure 3:
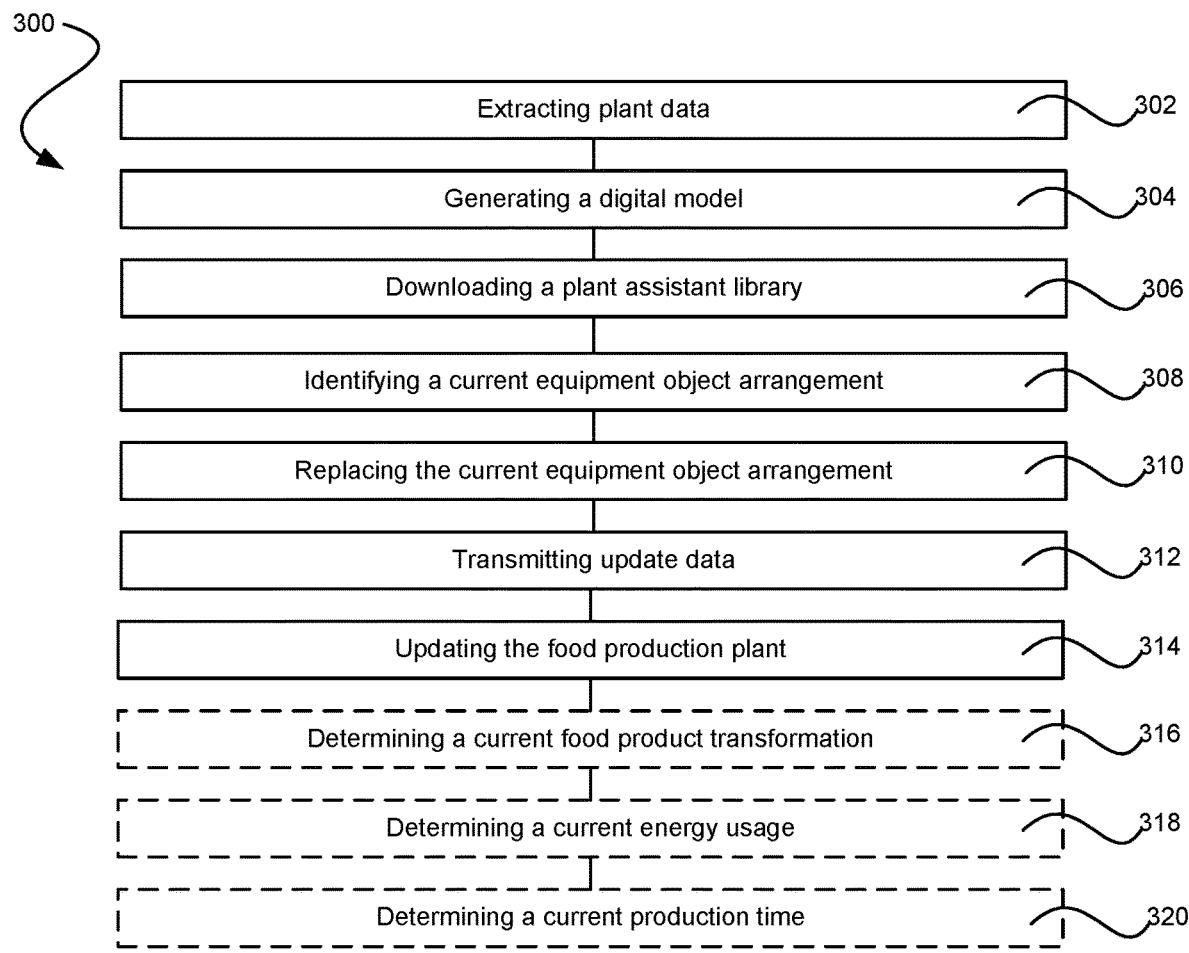
FIG. 3 is a flowchart illustrating the steps of a method for increasing efficiency of a food production plant.

FIG. 3 is a flowchart illustrating the steps of a method 300 for increasing efficiency of a food production plant.

In a first step 302, plant data can be extracted from a control system of the food production plant, wherein the control system can be communicatively connected to control units placed in food production units in the food production plant.

In a second step 304, the digital model of the food production plant, based on the plant data extracted from the control system, wherein the digital model can comprise equipment objects having actions linked thereto, connections between the equipment objects, and series of actions linked to equipment object arrangements, can be generated.

In a third step 306, a plant assistant library comprising a number of assistant objects, each assistant object comprising the initial production scenario comprising an initial series of actions linked to an initial equipment object arrangement, and the recommended production scenario comprising a recommended series of actions linked to the recommended equipment object arrangement, wherein the recommended production scenario can provide for an increased efficiency of the food production plant compared to the initial production scenario, can be downloaded.

In a fourth step 308, the current equipment object arrangement in the digital model 108 that corresponds to the initial equipment object arrangement of the initial production scenario 112 of a matching assistant object 116, can be identified.

In a fifth step 310, the current equipment object arrangement and a current series of activities linked to the current equipment object arrangement can be replaced by the recommended equipment object arrangement and the recommended series of the matching assistant object in the digital model 108.

In a sixth step 312, the update data 118 corresponding to the recommended equipment object arrangement and the recommended series in the digital model 108 to the control system 104 can be transmitted.

In a seventh step 314, the food production plant 100 can be updated based on the update data 118.

Optionally, in an eighth step 316, the current food product transformation for the current equipment object arrangement and the current series of activities, and the recommended food product transformation for the recommended series of actions linked to the recommended equipment object arrangement, can be determined.

Optionally, in a ninth step 318, the current energy usage for the current equipment object arrangement and a current series of activities, and the recommended energy usage for the recommended series of actions linked to the recommended equipment object arrangement, can be determined.

Optionally, in a tenth step 320, the current production time for the current equipment object arrangement and the current series of activities, and the recommended production time for the recommended series of actions linked to the recommended equipment object arrangement, can be determined.

Even though described in a certain order, the steps may be performed in other orders as well.

Figure 4:
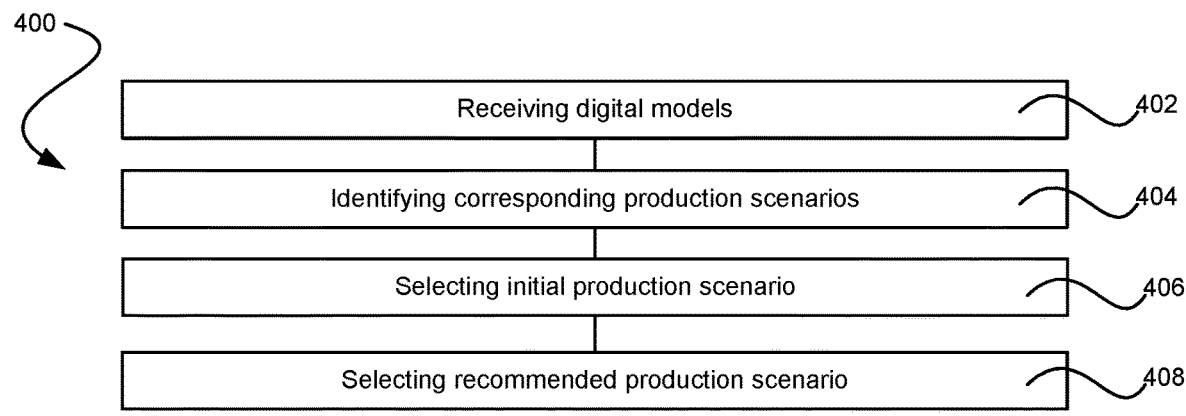
FIG. 4 is a flowchart illustrating the steps of a method for creating a plant assistant library to be used for increasing efficiency of a food production plant.

FIG. 4 is a flowchart illustrating the steps of a method 400 for creating a plant assistant library 110 to be used for increasing efficiency of a food production plant 100 as described above.

In first step 402, digital models on food production plants may be received.

In a second step 404, corresponding production scenarios in the digital models can be identified.

In a third step 406, the initial production scenario 112 can be selected among the corresponding production scenarios based on a first requirements set.

In a fourth step 408, the recommended production scenario 114 can be selected among the corresponding scenarios based on a second requirements set.

From the description above follows that, although various embodiments of the invention have been described and shown, the invention is not restricted thereto, but may also be embodied in other ways within the scope of the subject-matter defined in the following claims.

The invention claimed is:

1. A method for increasing efficiency of a food production plant, said method comprising:
    extracting plant data from a control system of the food production plant, wherein the control system is communicatively connected to control units placed in food production units in the food production plant,
    generating a digital model of the food production plant based on the plant data extracted from the control system, wherein the digital model comprises equipment objects having actions linked thereto, connections between the equipment objects, and series of actions linked to equipment object arrangements,
    downloading a plant assistant library comprising a number of assistant objects, each assistant object comprising:
        an initial production scenario comprising an initial series of actions linked to an initial equipment object arrangement, and
        a recommended production scenario comprising a recommended series of actions linked to a recommended equipment object arrangement, wherein the recommended production scenario provides for an increased efficiency of the food production plant compared to the initial production scenario,
    identifying a current equipment object arrangement in the digital model that matches the initial equipment object arrangement of the initial production scenario of a matching assistant object,
    replacing the current equipment object arrangement in the digital model with the recommended equipment object arrangement associated with the recommended production scenario of the matching assistant object,
    replacing a current series of actions linked to the current equipment object arrangement in the digital model with the recommended series of actions corresponding to the recommend production scenario of the matching assistant object,
    transmitting update data corresponding to the recommended equipment object arrangement and the recommended series of actions in the digital model to the control system, and
    updating the food production plant based on the update data.

2. The method according to claim 1, wherein the plant assistant library is retrieved from a central server connected to a plurality of food production plants having digital models, said central server being configured to continuously log data from the digital models and create assistant objects based on the data.

3. The method according to claim 1, wherein the digital model is control system type independent.

4. The method according to claim 1, wherein the initial production scenario and the recommended production scenario comprise a food product being produced, and food properties associated with the food product being produced.

5. The method according to claim 4, further comprising:
    determining a current food product transformation for the current equipment object arrangement and the current series of actions, and a recommended food product transformation for the recommended series of actions linked to the recommended equipment object arrangement.

6. The method according to claim 5 comprising:
    determining a current energy usage for the current equipment object arrangement and the current series of actions, and a recommended energy usage for the recommended series of actions linked to the recommended equipment object arrangement.

7. The method according to claim 6, further comprising:
    determining a current production time for the current equipment object arrangement and the current series of actions, and a recommended production time for the recommended series of actions linked to the recommended equipment object arrangement.

8. The method according to claim 4, wherein an initial order in which the food production units is used in the initial production scenario is different from a recommended order in which the food production units is used in the recommended production scenario.

9. The method according to claim 1, wherein identifying the current equipment object arrangement in the digital model that matches the initial equipment object arrangement of the initial production scenario of the matching assistant object is made by an artificial intelligence (AI) based software, wherein the AI based software is trained on approved digital models of food production plants.

10. A method for creating the plant assistant library to be used for increasing the efficiency of the food production plant according to claim 1, comprising creating the number of assistant objects of the plant assistant library by:
receiving digital models on food production plants,
identifying corresponding production scenarios in the digital models,
selecting the initial production scenario for an assistant object of the number of assistant objects among the corresponding production scenarios based on a first requirements set, and
selecting the recommended production scenario for the assistant object of the number of assistant objects among the corresponding scenarios based on a second requirements set.

11. A non-transitory computer readable medium storing a computer program comprising instructions for implementing the method of claim 1.

12. The method according to claim 1, wherein the current equipment object arrangement matches the initial equipment object arrangement of the initial production scenario of the matching assistant object when a match between the current object arrangement and the initial object arrangement is identical.

13. A server configured to increase efficiency of a food production plant, the server comprising:
a transceiver configured to:
transmit update data corresponding to recommended equipment object arrangement and recommended series in a digital model to a control system, and a control circuitry configured to:
extract plant data from the control system of the food production plant, wherein the control system is communicatively connected to control units placed in food production units in the food production plant,
generate the digital model of the food production plant based on the plant data extracted from the control system, wherein the digital model comprises equipment objects having actions linked thereto, connections between the equipment objects, and series of actions linked to equipment object arrangements,
download a plant assistant library comprising a number of assistant objects, each assistant object comprising:
an initial production scenario comprising an initial series of actions linked to an initial equipment object arrangement, and
a recommended production scenario comprising the recommended series of actions linked to the recommended equipment object arrangement, wherein the recommended production scenario provides for an increased efficiency of the food production plant compared to the initial production scenario,
identify a current equipment object arrangement in the digital model that matches the initial equipment object arrangement of the initial production scenario of a matching assistant object,
replace the current equipment object arrangement in the digital model with the recommended equipment object arrangement associated with the recommended production scenario of the matching assistant object,
replace a current series of actions linked to the current equipment object arrangement in the digital model with the recommended series of actions corresponding to the recommended production scenario of the matching assistant object, and
update the food production plant based on the update data.

14. The server according to claim 13, wherein the current equipment object arrangement matches the initial equipment object arrangement of the initial production scenario of the matching assistant object when a match between the current object arrangement and the initial object arrangement is identical.

15. The server according to claim 13, wherein identifying the current equipment object arrangement in the digital model that matches the initial equipment object arrangement of the initial production scenario of the matching assistant object is made by an artificial intelligence (AI) based software, wherein the AI based software is trained on approved digital models of food production plants.

16. The server according to claim 13, wherein the control circuitry is further configured to:
determine a current food product transformation for the current equipment object arrangement and the current series of actions, and a recommended food product transformation for the recommended series of actions linked to the recommended equipment object arrangement.

17. The server according to claim 16 wherein the control circuitry is further configured to:
determine a current energy, and
determine usage for the current equipment object arrangement and a current series of actions, and a recommended energy usage for the recommended series of actions linked to the recommended equipment object arrangement.

18. The server according to claim 16, wherein the control circuitry is further configured to:
determine a current production time for the current equipment object arrangement and the current series of actions, and a recommended production time for the recommended series of actions linked to the recommended equipment object arrangement.

* * * * *